US012027301B2

(12) United States Patent
Yasuda et al.

(10) Patent No.: US 12,027,301 B2
(45) Date of Patent: Jul. 2, 2024

(54) ELECTRONIC DEVICE

(71) Applicants: TDK CORPORATION, Tokyo (JP); TDK XIAMEN CO., LTD., Fujian (CN)

(72) Inventors: Masatoshi Yasuda, Tokyo (JP); Hiroshi Maeda, Xiamen (CN); Atsushi Shoji, Tokyo (JP); Shoichi Tani, Xiamen (CN)

(73) Assignees: TDK CORPORATION, Tokyo (JP); TDK XIAMEN CO., LTD., Xiamen (CN)

( * ) Notice: Subject to any disclaimer, the term of this patent is extended or adjusted under 35 U.S.C. 154(b) by 582 days.

(21) Appl. No.: 17/166,106

(22) Filed: Feb. 3, 2021

(65) Prior Publication Data

US 2021/0249181 A1 Aug. 12, 2021

(30) Foreign Application Priority Data

Feb. 7, 2020 (CN) ......................... 202010082258.6

(51) Int. Cl.
*H01F 27/28* (2006.01)
*H01F 27/26* (2006.01)
*H01F 27/29* (2006.01)
*H01F 27/32* (2006.01)

(52) U.S. Cl.
CPC ....... *H01F 27/2828* (2013.01); *H01F 27/263* (2013.01); *H01F 27/292* (2013.01); *H01F 27/325* (2013.01)

(58) Field of Classification Search
CPC .. H01F 27/2828; H01F 27/263; H01F 27/292; H01F 27/325
See application file for complete search history.

(56) References Cited

U.S. PATENT DOCUMENTS

| | | | | |
|---|---|---|---|---|
| 5,404,123 | A * | 4/1995 | Joseph ...................... | H01F 5/02 336/208 |
| 6,154,113 | A * | 11/2000 | Murai ................. | H01F 27/2828 336/208 |
| 2007/0046413 | A1 * | 3/2007 | Yamashita ............ | H01F 17/045 336/96 |
| 2009/0108979 | A1 * | 4/2009 | Kosugi ................. | H01F 27/326 336/208 |
| 2011/0043315 | A1 * | 2/2011 | Kobayashi ............ | H01F 27/325 29/606 |
| 2011/0187485 | A1 * | 8/2011 | Toyoda ................. | H01F 27/306 336/192 |
| 2014/0159852 | A1 * | 6/2014 | Miura ..................... | H01F 27/02 336/208 |

(Continued)

FOREIGN PATENT DOCUMENTS

| | | |
|---|---|---|
| JP | H09-162036 A | 6/1997 |
| JP | 2009-038244 A | 2/2009 |

(Continued)

*Primary Examiner* — Malcolm Barnes
(74) *Attorney, Agent, or Firm* — Oliff PLC

(57) ABSTRACT

A composite coil device includes a winding shaft portion, a first conductor portion, and a second conductor portion. The winding shaft portion at least partly includes a magnetic body and axially includes a first section and a second section. The first conductor portion is wound continuously in the first section and the second section. The second conductor portion is wound in the second section.

13 Claims, 9 Drawing Sheets

(56) References Cited

U.S. PATENT DOCUMENTS

2014/0167903 A1* 6/2014 Tomonari .............. H01F 17/045
336/220
2016/0293317 A1* 10/2016 Iwakura .................... H01F 5/02
2017/0169935 A1* 6/2017 Miyamoto .......... H01F 27/2828
2019/0080836 A1* 3/2019 Yasuda ................... H01F 27/29
2022/0102050 A1* 3/2022 Monma ................... H01F 27/26

FOREIGN PATENT DOCUMENTS

JP 2009-224649 A 10/2009
JP 2011-146732 A 7/2011
JP 2017-228896 A 12/2017
JP 2019-050280 A 3/2019

* cited by examiner

ELECTRONIC DEVICE

BACKGROUND OF THE INVENTION

The present invention relates to a composite coil device capable of combining two or more coil elements, such as a transformer and a common mode filter.

For example, Patent Document 1 proposes a composite coil device capable of combining two or more coil elements, such as a pulse transformer and a choke coil transformer.

In the conventional technique as shown in Patent Document 1, however, a complex winding operation for a plurality of toroidal cores is carried out manually. Thus, there are problems that it is difficult to automate the winding operation, the quality is not stable, and the manufacturing cost is high.

Patent Document 1: JPH09162036 (A)

BRIEF SUMMARY OF INVENTION

The present invention has been achieved under such circumstances. It is an object of the invention to provide a composite coil device with stable quality at low cost with easy automation of winding operation.

To achieve the above object, a composite coil device according to the present invention includes:

a winding shaft portion at least partly including a magnetic body and axially including a first section and a second section;

a first conductor portion wound continuously in the first section and the second section; and a second conductor portion wound in the second section.

In the composite coil device according to the present invention, different coil elements can be formed in the first section and the second section by continuing the first conductor portion between the first section and the second section, and a transformer can be constituted between the second conductor portion wound in the second section and the first conductor portion. In the first section, it is possible to constitute a coil element having a different function from the transformer formed in the second section.

In the composite coil device according to the present invention, coil elements having different functions can be formed in the first section and the second section without disposing an intermediate connection. In the composite coil device 10 according to the present invention, since no intermediate connection needs to be disposed, it is easy to automate the winding operation with an automatic winding machine, the cost can be reduced, and the stability of quality can easily be ensured. Compared to conventional composite coil devices in which a plurality of coil devices having different functions is connected by wiring, the composite coil device according to the present invention can be miniaturized significantly.

The composite coil device according to the present invention may further include a third conductor portion wound continuously in the first section and the second section, in addition to the first conductor portion. The first conductor portion, the second conductor portion, and the third conductor portion are wound around the winding shaft portion in the same axis.

In this structure, a circuit having a function of common mode filter or so can be formed by the first conductor portion and the third conductor portion in the first section, and an additional transformer can be formed between the third conductor portion and the second conductor portion in the second section. Moreover, this structure makes it possible to significantly downsize the composite coil device compared to conventional composite coil devices in which a common mode filter and a transformer are manufactured by separate coil devices and connected.

The winding shaft portion may include a direction-changing portion, and the first conductor portion may be wound around the winding shaft portion in opposite directions between the first section and the second section. When the direction-changing portion is formed, the first conductor portion can also be wound around the winding shaft portion in opposite directions between the first section and the second section. Likewise, the third conductor portion can be wound around the winding shaft portion in opposite directions between the first section and the second section, but may be wound around the winding shaft portion in the same direction between the first section and the second section without being folded at the direction-changing portion.

Preferably, the first conductor portion and the second conductor portion are wound in mutually different layers at least in the second section. Preferably, when the third conductor portion is wound around the winding shaft portion continuously between the first section and the second section, the first conductor portion, the second conductor portion, and the third conductor portion are wound in mutually different layers in the second section, and the first conductor portion and the third conductor portion are wound in mutually different layers in the first section. In this structure, it is possible to effectively prevent a winding turbulence of the conductors for the winding shaft portion and is easy to control the number of windings. This contributes to the stabilization of quality.

Preferably, the winding shaft portion includes a partition wall for partitioning the first section and the second section. When the partition wall is formed, different coil elements are easily formed between the first section and the second section, and the coil elements are easily prevented from interfering with each other in the first section and the second section. Preferably, the partition wall is also formed in the core body made of magnetic material. This structure makes it easy to prevent the coil elements from interfering with each other in the first section and the second section.

Preferably, the winding shaft portion includes a notch connecting the first section and the second section. The first conductor portion or the third conductor portion can be wound around the same winding shaft while being continuous between the first section and the second section via the notch. Incidentally, the second conductor portion is preferably wound around the winding shaft only in the second section, but the second conductor portion may be wound around the winding shaft portion in the first section and the second section via the notch depending on the application.

Preferably, the notch is formed on a mounting surface side. Preferably, the winding shaft portion includes an insulation member, the insulation member includes the partition wall, the insulation member is located on the mounting surface side, and the partition wall of the insulation member includes with the notch. In this structure, the first conductor portion or the third conductor portion can pass between the first section and the second section via the notch formed on the partition wall of the insulation member. Thus, a coil element continuing between the first section and the second section is easily formed while maintaining the insulation with, for example, an external circuit board. In addition, the structure contributes to downsizing of the device.

Preferably, the winding shaft portion is structured by attaching at least a part of a core made of the magnetic body to a concave portion of a bobbin having an opening. In this structure, it is possible to more easily form coil elements having different functions in the first section and the second section without disposing an intermediate connection.

Preferably, the bobbin is disposed on a mounting surface side. In this structure, a coil element continuing between the first section and the second section is easily formed while maintaining the insulation with, for example, an external circuit board. In addition, the structure contributes to downsizing of the device.

Preferably, the core comprises separatable members combined with each other. For example, the magnetic body included in the winding shaft portion may be structured by a core having an E-shaped cross section, and a core combined with the core having an E-shaped cross section may be a flat-plate-shaped core. When the core is a core having an E-shaped cross section, the first section and the second section can easily be formed in the magnetic body, and the partition wall can also easily be formed between the first section and the second section.

In addition, the core having an E-shaped cross section may be separated in the axis direction of the winding shaft portion. For example, when the core having an E-shaped cross section is axially separated into a core constituting the first section and a core constituting the second section, the coil elements formed in the sections can further be prevented from interfering with each other. Moreover, for example, the coupling coefficient between the coil elements can be reduced. The flat-plate-shaped core may also be separated in the axis direction of the winding shaft portion. This structure can further reduce the coupling between the coil elements formed in the first section and the second section.

Preferably, the magnetic body has a shape for forming a closed magnetic path in the first section and/or the second section. This structure can further reduce the coupling between the coil elements formed in the first section and the second section.

Preferably, the magnetic body has a plate member in the first section and/or the second section. When the magnetic body has the plate member, a suction chuck or so can easily detachably be attached to an outer surface of the plate member, and a pickup transportation of the composite coil device can easily be automated. In addition, when the plate member is a magnetic body, a closed magnetic path is easily formed in the first section and/or the second section.

Preferably, the second conductor portion comprises at least two conductor wires bifilar-wound around the winding shaft portion. In this structure, two or more of transformers are easily formed in the second section.

A spacer for preventing a winding disturbance of the first conductor portion or the second conductor portion may be disposed on the winding shaft portion located in the first section or the second section. When the spacer is disposed as necessary, a winding disturbance can effectively be prevented.

DETAILED DESCRIPTION OF INVENTION

Hereinafter, the present invention is explained based on embodiments shown in the figures.

First Embodiment

Figure 1:
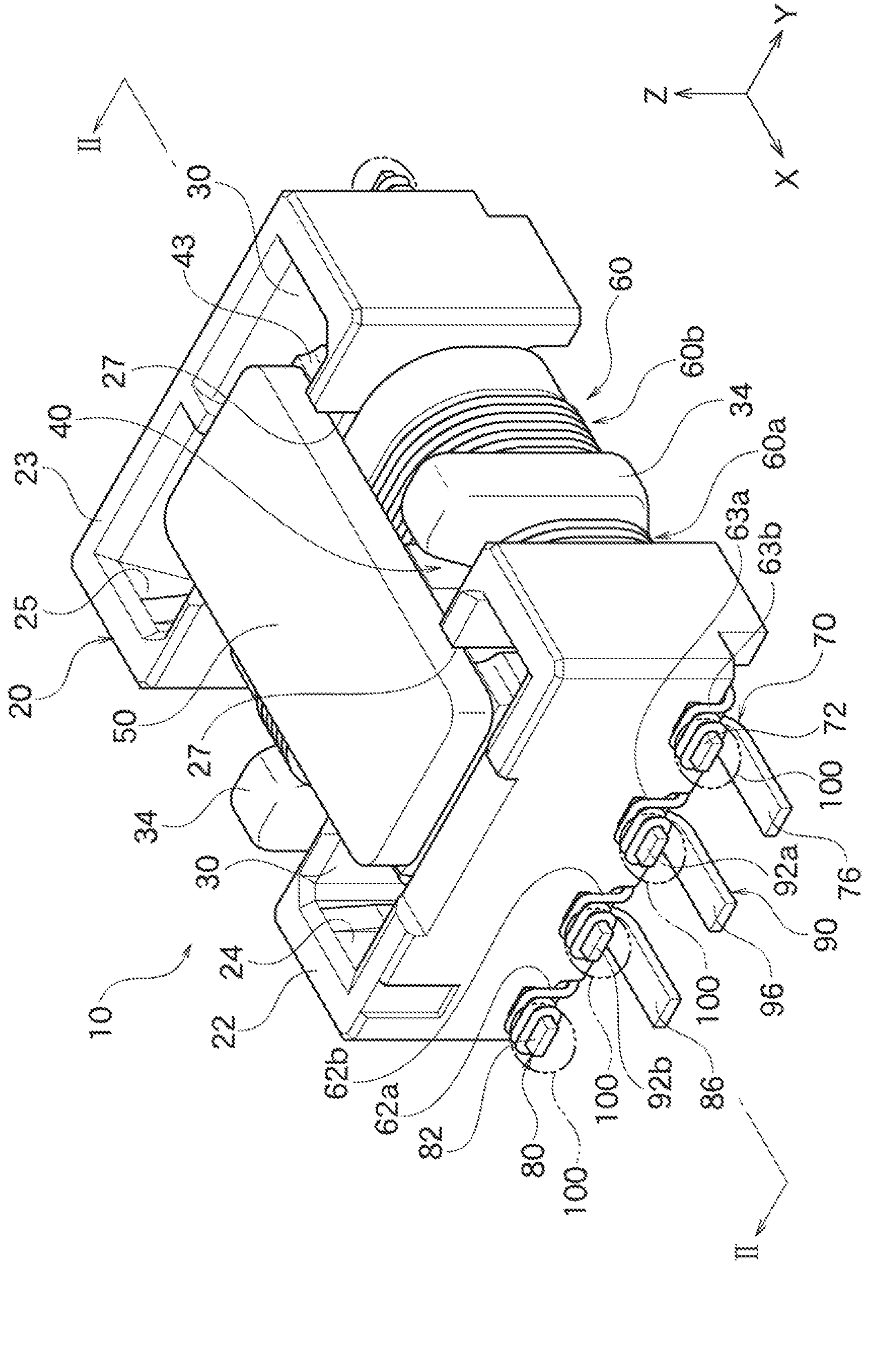
FIG. 1 is a perspective view of a composite coil device according to an embodiment of the present invention.

A composite coil device 10 according to the present embodiment shown in FIG. 1 is used as, for example, a composite coil device in which a transformer and a common mode filter are integrated in an application of a battery management system (BMS). However, the composite coil device 10 may be used for other applications, such as voltage conversion of a battery of a vehicle (e.g., car) and voltage conversion of a battery of an electronic device. The composite coil device 10 includes a bobbin 20, a core body 40, a flat plate portion 50, and a coil portion 60.

Figure 5:
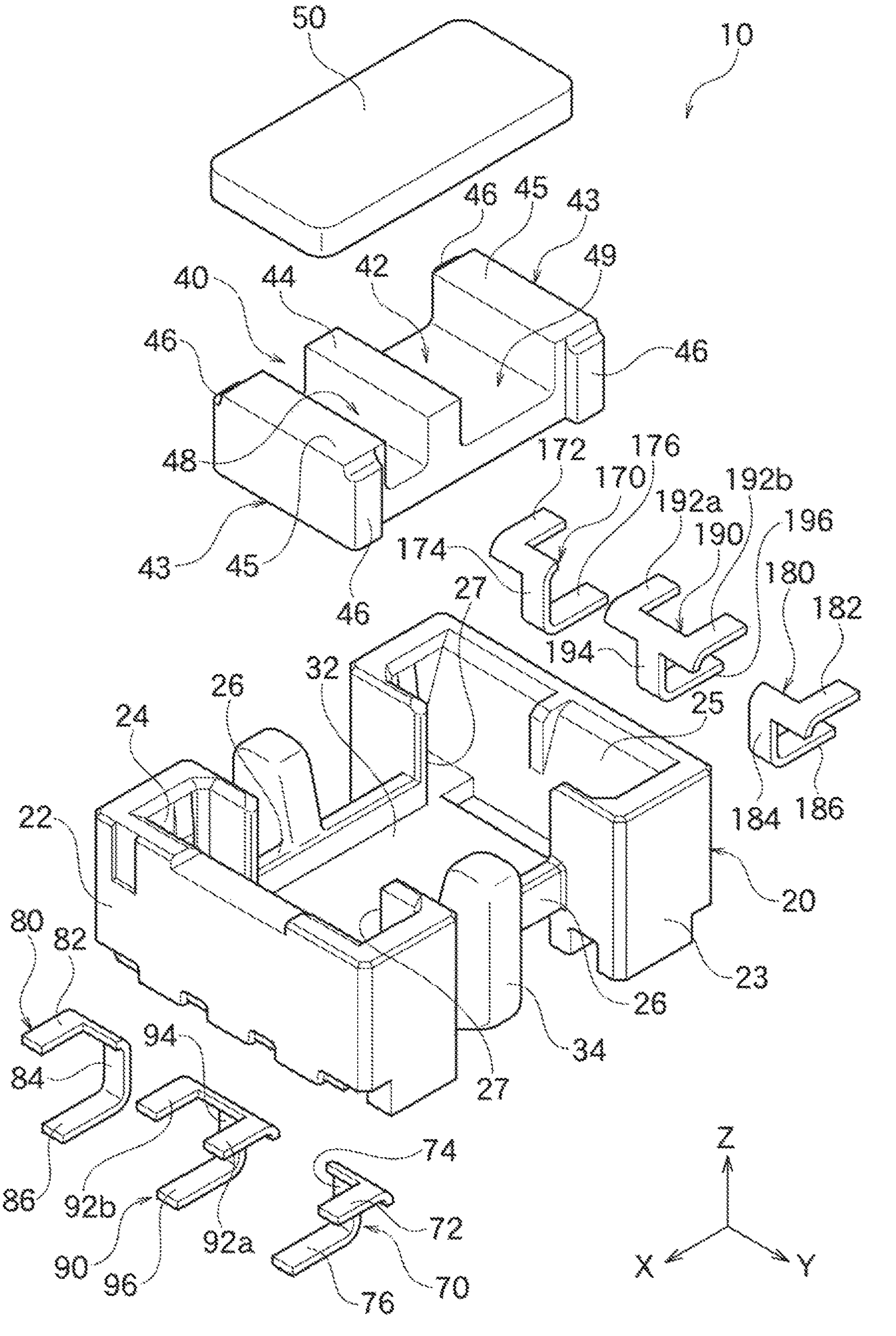
FIG. 5 is an exploded perspective view of the composite coil device shown in FIG. 1 (a wire is not illustrated)

As shown in FIG. 5, the bobbin 20 includes a pair of terminal blocks 22 and 23 arranged away from each other in the X-axis direction. The terminal blocks 22 and 23 are connected and integrated with a bottom plate 32 extending in the X-axis direction by a pair of connection side portions 26. The terminal block 22 (23) is provided with a flange accommodation concave portion 24 (25) having an opening above in the Z-axis direction. Preferably, a tapered slope is formed in the opening of the flange accommodation concave portion 24 (25) so that a flange portion 43 (43) of the core body 40 mentioned below is easy to enter.

In the figures, the X-axis, the Y-axis, and the Z-axis are substantially perpendicular to each other. In the present embodiment, the X-axis substantially corresponds with an extension direction of the connection side portions 26 (also substantially corresponds with the winding axis of the coil portion 60 shown in FIG. 1), the Y-axis corresponds with a direction where the pair of connection side portions 26 are away from each other, and the Z-axis corresponds with a height direction of the composite coil device 10. The lower side in the Z-axis corresponds with a mounting surface side.

As shown in FIG. 5, the core body 40 includes a flat-plate-shaped bottom wall 42 and a pair of flange portions 43 located on both ends of the bottom wall 42 in the X-axis direction. Each of the flange portions 43 includes a flange central portion 45 whose width in the Y-axis direction is substantially the same as that of the bottom wall 42. A pair of flange side convex portions 46 is integrally formed on both sides of each of the flange central portions 45 in the Y-axis direction and is structured to protrude outward in the Y-axis direction from both ends of the bottom wall 42 in the Y-axis direction. Incidentally, “outward” means a direction away from the center (center of gravity) of the composite coil device 10, and “inward” means a direction approaching the center (center of gravity) of the composite coil device 10.

In the present embodiment, the height of the flange central portions 45 in the Z-axis direction (hereinafter, also simply referred to as "height") is higher than that of the flange side convex portions 46, a step is formed on the upper surface of the flange portion 43 (43) in the Z-axis direction (hereinafter, also simply referred to as "upper surface"), and the lower surfaces of the flange portions 43 in the Z-axis direction (hereinafter, also simply referred to as "lower surfaces") are substantially flush with each other.

The lower surface of the bottom wall 42 is substantially flush with the lower surfaces of the flange central portions 45. The thickness of the bottom wall 42 in the Z-axis direction (hereinafter, also simply referred to as "thickness") is substantially the same as the height of the connection side portions 26 from the upper surface of the bottom plate 32. The lower surfaces of the connection side portions 26 are substantially flush with the lower surface of the bottom plate 32.

When the flange portions 43 are accommodated in the flange accommodation concave portions 24 and 25 of the terminal blocks 22 and 23, the bottom wall 42 of the core body 40 is located between the pair of connection side portions 26, the upper surface of the bottom wall 42 and the upper surfaces of the connection side portions 26 substantially correspond with each other, and the lower surface of the bottom wall 42 and the upper surface of the bottom plate 32 contact with each other. Incidentally, "substantially correspond" means that the upper surface of the bottom wall 42 and the upper surfaces of the connection side portions 26 may slightly deviate from each other as long as the winding operation of wires (conductors) 62-65 mentioned below is not disturbed.

In the present embodiment, a partition wall 44 is formed integrally with the bottom wall 42 on the upper surface of the flat-plate-shaped bottom wall 42 located between the pair of flange portions 43. Preferably, the protrusion height of the partition wall 44 in the Z-axis direction from the upper surface of the bottom wall 42 is substantially the same as or slightly lower than that of the flange portion 43 (43) in the Z-axis direction. Preferably, the thickness of the partition wall 44 in the X-axis direction is substantially the same as that of the flange portion 43 (43) in the X-axis direction. Preferably, the width of the partition wall 44 in the Y-axis direction is substantially the same as that of the bottom wall 42 in the Y-axis direction.

Figure 2:
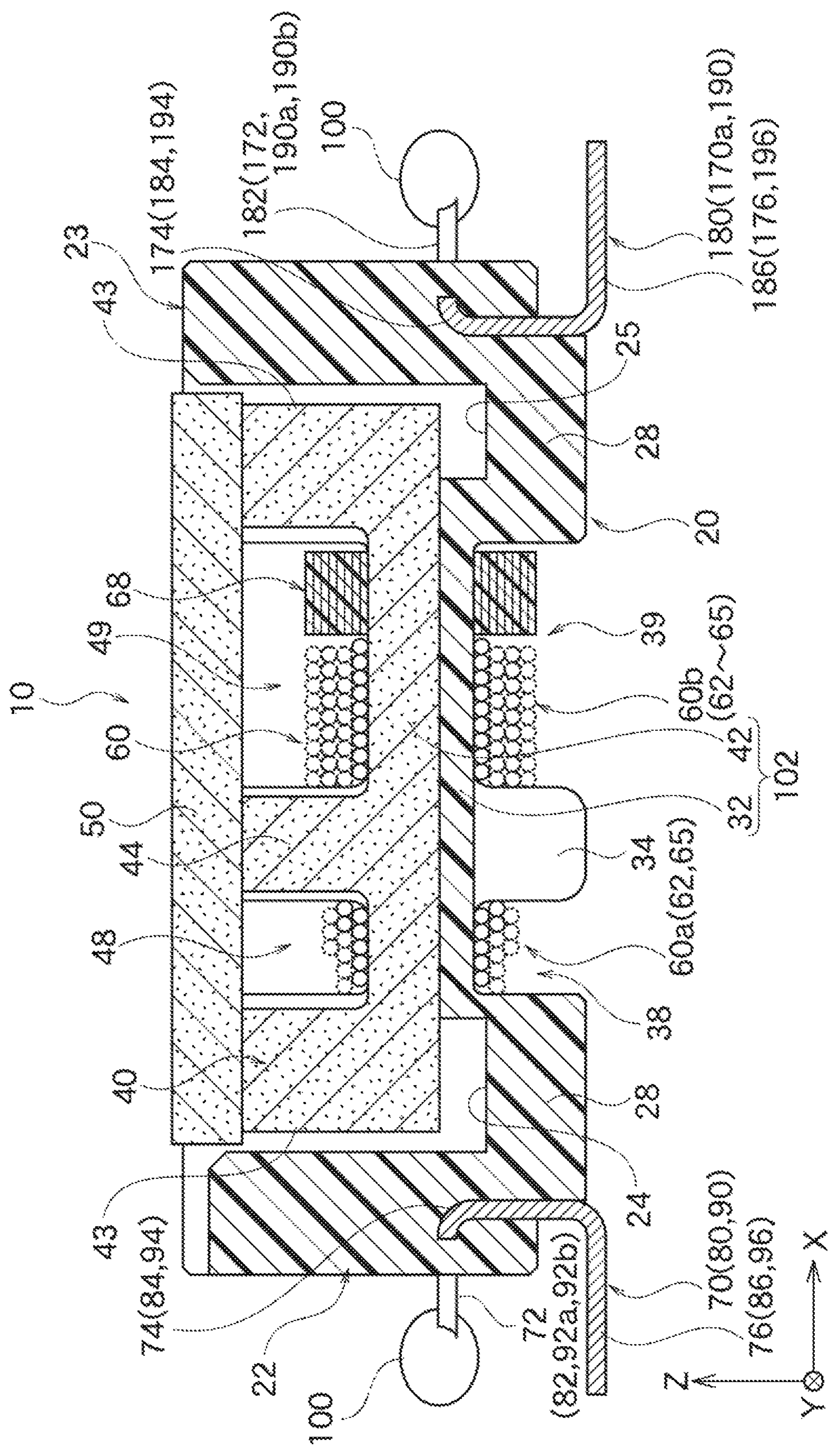
FIG. 2 is a schematic cross-sectional view along the II-II line of the composite coil device shown in FIG. 1.

Since the core body 40 is provided with the partition wall 44, the core body 40 is divided into a first section 48 and a second section 49 in the X-axis direction and has a substantially E shape on a cross section parallel to the X-Z axis as shown in FIG. 2. That is, the core body 40 is also referred to as an E-type core.

The flat plate portion 50 is formed as a separate member from the core body 40 and has a length that is substantially the same as the length of the core body 40 in the X-axis direction (hereinafter, also simply referred to as "length") and a width that is substantially the same as the width of the bottom wall 42 of the core body 40 in the Y-axis direction (hereinafter, also simply referred to as "width"). Preferably, the thickness of the flat plate portion 50 is 70-130% of the thickness of the bottom wall 42. The flat plate portion 50 is preferably contacted with at least the pair of flange portions 43 and is more preferably also contacted with the upper surface of the partition wall 44, but may not necessarily be contacted with the upper surface of the partition wall 44.

The core body 40 is made of a metal or a magnetic material of ferrite or so, but the kind of the magnetic material is not limited. The flat plate portion 50 is preferably made of a magnetic material similar to that of the core body 40, but the flat plate portion 50 and the core body 40 may not necessarily be made of the same magnetic material. The flat plate portion 50 may be made of a nonmagnetic material, such as synthetic resin.

As shown in FIG. 5, a notch 27 is formed on an inner wall of the terminal block 22 (23) of the bobbin 20 in the X-axis direction. The width of the notch 27 (27) is equal to or larger than that of the bottom wall 42 and is preferably substantially the same as the distance between the pair of connection side portions 26 in the Y-axis direction. The height of the notch 27 (27) is substantially the same as the depth (height) of the flange accommodation concave portion 24 (25).

The boundary portion between the bottom wall 42 and the flange portion 43 (43) of the core body 40 is inserted via the notch 27 (27). The flange portions 43 are accommodated into the flange accommodation concave portions 24 and 25. The lower surface of the bottom wall 42 is disposed on the upper surface of the bottom wall 32. The bottom wall 42 is disposed between the pair of connection side portions 26. The upper part of the bottom wall 42 is open upward in the Z-axis direction between the pair of connection side portions 26.

As shown in FIG. 1, both ends of the flat plate portion 50 different from the core body 40 are inserted into the upper parts of the notches 27. As shown in FIG. 2, the upper surface of the flat plate portion 50 protrudes upward in the Z-axis direction from the upper surfaces of the terminal blocks 22 and 23 by a predetermined height. The predetermined height is preferably ½ or less (more preferably, ¼ or less) of the thickness of the flat plate portion 50. The upper surface of the flat plate portion 50 may be the same as the upper surfaces of the terminal blocks 22 and 23 or may be dented from the upper surfaces of the terminal blocks 22 and 23 in the Z-axis direction.

Figure 4A:
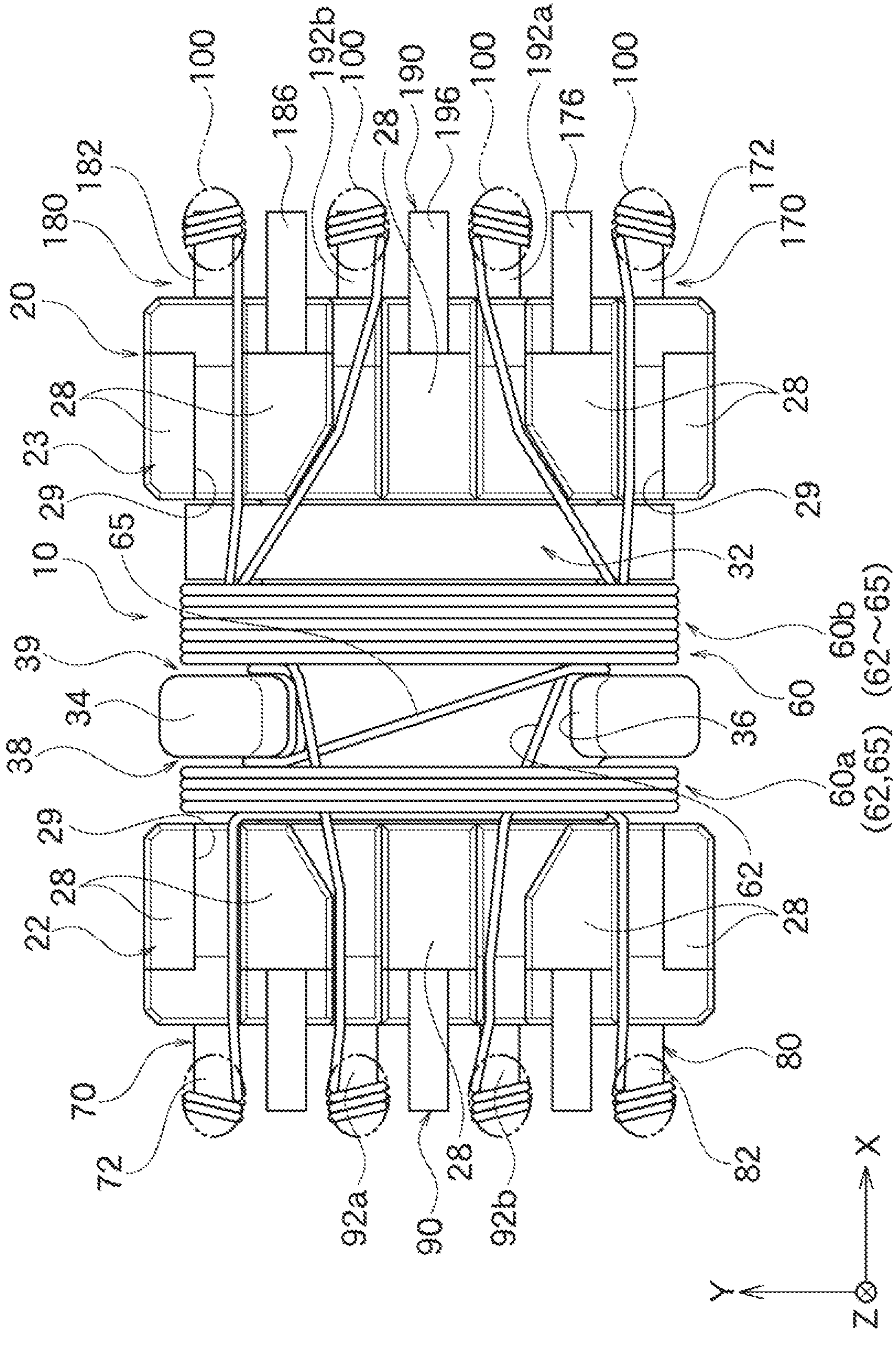
FIG. 4A is a bottom view of the composite coil device shown in FIG. 1.

As shown in FIG. 2 and FIG. 5, partition walls 34 on the bobbin side are formed integrally with the bobbin 20 at a position corresponding to the partition wall 44 of the core body 40 on the outer surfaces of the connection side portions 26 of the bobbin 20. The partition walls 34 on the bobbin side divide the lower surface of the bottom wall 32 and the outer surfaces of the connection side portions 26 into a first section 38 and a second section 39 in the X-axis direction. As shown in FIG. 4A, however, the partition wall 34 (34) is provided with a notch 36 not continuous in the Y-axis direction on the lower surface of the bottom wall 32, and the lower surface of the bottom wall 32 is continuous in the first section 38 and the second section 39 on the portion where the notch 36 (36) is formed.

As shown in FIG. 5, the partition walls 34 integrally formed on the outer surfaces of the connection side portions 26 protrude upward in the Z-axis direction from the connection side portions 26. Preferably, the protrusion height of the partition wall 34 (34) in the Z-axis direction is equal to or smaller than that of the terminal block 22 (23) in the Z-axis direction. Also in the above of the partition walls 34 in the Z-axis direction, the partition walls 34 are notched by a width equal to or larger than the interval between the pair of connection side portions 26. That is, the partition walls 34 are structured by a pair of partition plate pieces integrally formed on the pair of connection side portions 26.

As shown in FIG. 2, the partition walls 34 are combined with the partition wall 44 on the core side and can separate the coil portion 60 wound around a winding shaft portion 102 formed from the bottom wall 32 and the bottom wall 42 into a first section **60*a* and a second section 60*b*. That is, the first section 60*a* of the coil portion 60 is formed by combining the first section 48 of the core body 40 and the first section 38 of the bobbin 20, and the second section 60***b* of the coil portion 60 is formed by combining the second section 49 of the core body 40 and the second section 39 of the bobbin 20. As shown in FIG. 4A, the wire (conductor) 62 (65) located in the first section 60*a* and the wire 62 (65) located in the second section 60*b* can be continuous via the notch 36 formed on the partition wall 34.

Terminals 70, 90, and 80 are attached in this order to the terminal block 22 of the bobbin 20 shown in FIG. 5 at predetermined intervals in the Y-axis. The terminal 70 and the terminal 80 have a mutually line-symmetrical shape and a similar structural part, but are not completely the same member. Unlike the terminal 70 and the terminal 80, the terminal 90 disposed between the terminal 70 and the terminal 80 in the Y-axis direction includes two joint wire portions 92*a* and 92*b*.

The terminal 70 includes a joint wire portion 72, an embedded portion 74, and a mounting portion 76, and these are integrally formed by, for example, pressing a conductive plate member, such a metal piece. The terminal 80 includes a joint wire portion 82, an embedded portion 84, and a mounting portion 86, and these are integrally formed by, for example, pressing a conductive plate member, such a metal piece.

The terminal 90 includes two joint wire portions 92*a* and 92*b*, an embedded portion 94 integrally formed to connect the joint wire portions 92*a* and 92*b*, and a single mounted portion 96 continuing to a lower end of the embedded portion 94. As with the terminals 70 and 80, the terminal 90 is also integrally formed by, for example, pressing a conductive plate member, such a metal piece.

As shown in FIG. 2, the embedded portion 74 (84, 94) of the terminal 70 (80, 90) is embedded in an insulation material of the bobbin 20 at an outer part of the terminal block 22 in the X-axis direction and at a lower part in the Z-axis direction. Preferably, the embedded portion 74 (84, 94) is not exposed to the inner wall surface of the flange accommodation concave portion 24 of the terminal block 22, but is embedded in the insulation material of the bobbin 20.

Terminals 170, 190, and 180 are attached in this order to the terminal block 23 of the bobbin 20 shown in FIG. 5 at predetermined intervals in the Y-axis. The terminal 170 and the terminal 180 have a mutually line-symmetrical shape and a similar structural part, but are not completely the same member. The terminal 170 and the terminal 180 correspond with the terminal 70 and the terminal 80, respectively, and may be the same member. Unlike the terminal 170 and the terminal 180, the terminal 190 disposed between the terminal 170 and the terminal 180 in the Y-axis direction include two joint wire portions 192*a* and 192*b*. The terminal 190 corresponds with the terminal 90. The terminal 90 and the terminal 190 may be the same member.

The terminal 170 includes a joint wire portion 172, an embedded portion 174, and a mounting portion 176, and these are integrally formed by, for example, pressing a conductive plate member, such a metal piece. The terminal 180 includes a joint wire portion 182, an embedded portion 184, and a mounting portion 186, and these are integrally formed by, for example, pressing a conductive plate member, such a metal piece.

The terminal 190 includes two joint wire portions 192*a* and 192*b*, an embedded portion 194 integrally formed to connect the joint wire portions 192*a* and 192*b*, and a single mounted portion 196 continuing to a lower end of the embedded portion 194. As with the terminals 170 and 180, the terminal 190 is also integrally formed by, for example, pressing a conductive plate material, such a metal piece.

As shown in FIG. 2, the embedded portion 174 (184, 194) of the terminal 170 (180, 190) is embedded in an insulation material of the bobbin 20 at an outer part of the terminal block 23 in the X-axis direction and at a lower part in the Z-axis direction. Preferably, the embedded portion 174 (184, 194) is not exposed to the inner wall surface of the flange accommodation concave portion 25 of the terminal block 23, but is embedded in the insulation material of the bobbin 20.

The terminals 70, 80, 90, 170, 180, and 190 are made of any conductive material, such as metals of phosphor bronze, tough pitch steel, oxygen-free steel, stainless steel, brass, and copper-nickel alloy.

The bobbin 20 is made of any insulation material, such as synthetic resins of LCP, nylon, phenol, DAP, PBT, and PET. The terminals 70 and 80 are insert-molded at the time of forming the bobbin 20 and are integrated with the bobbin 20.

As shown in FIG. 2, the mounted portions 76, 86, and 96 (176, 186, and 196) of the terminals 70, 80, and 90 are attached to the bobbin 20 so as to protrude outward in the X-axis direction from the end surfaces of the terminal stocks 22 and 23 on the lower surface (bottom surface) of the bobbin 20. The joint wire portions 72, 82, 92*a*, and 92*b* (172, 182, 192*a*, and 192*b*) are attached to the bobbin 20 so as to protrude outward in the X-axis direction from the end surfaces of the terminal blocks 22 and 23 at a position higher than the mounted portions 76, 86, and 96 (176, 186, and 196) in the Z-axis direction.

Figure 3:
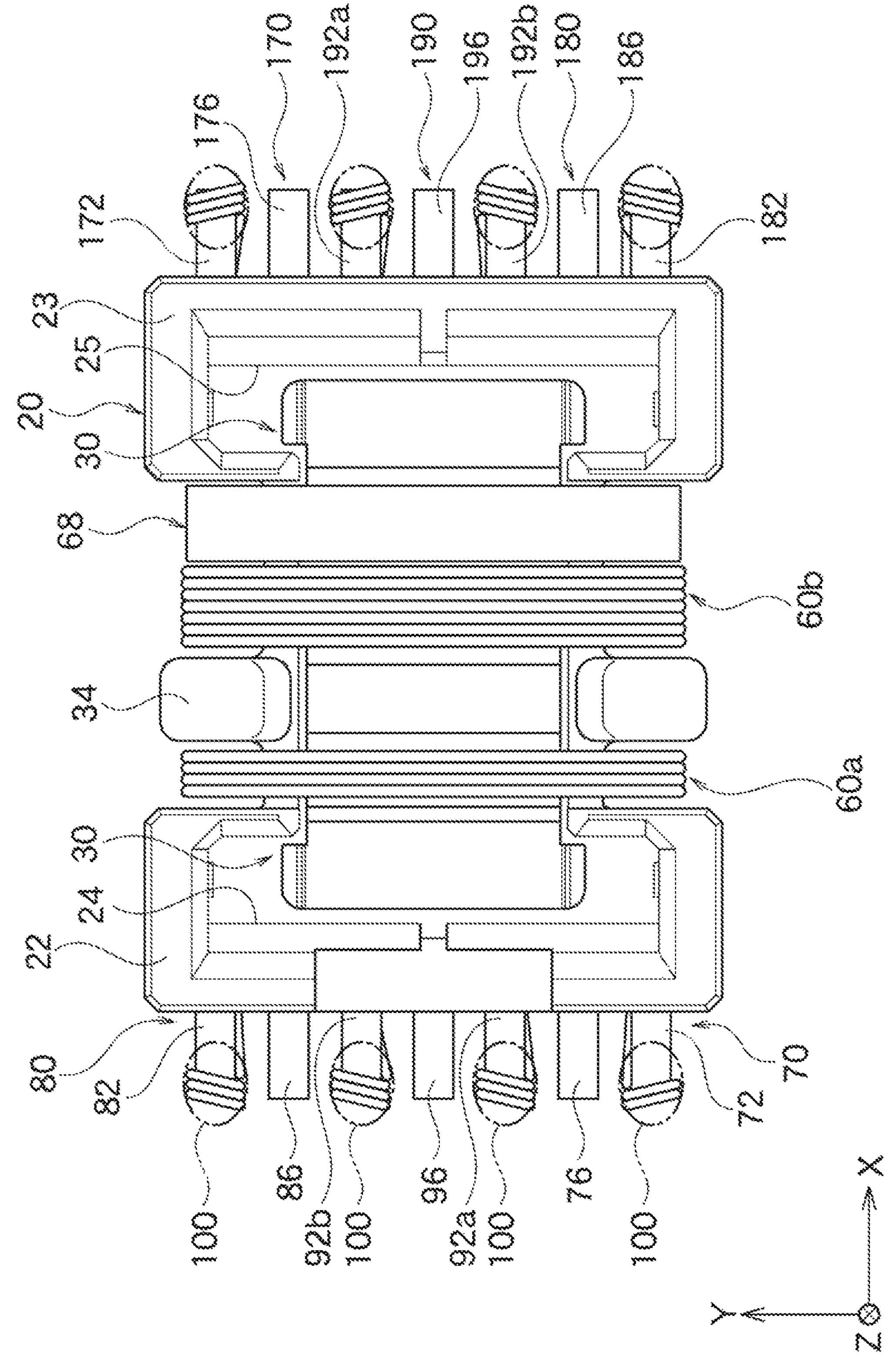
FIG. 3 is a plane view of the composite coil device shown in FIG. 1.

As shown in FIG. 3 and FIG. 4A, when viewed from the Z-axis direction, the joint wire portions 72, 82, 92*a*, and 92*b* (172, 182, 192*a*, and 192*b*) and the mounted portions 76, 86, and 96 (176, 186, and 196) of the terminals 70, 80, and 90 (170, 180, and 190) are positionally shifted in the Y-axis direction. In the present embodiment, the embedded portions 74, 84, and 94 (174, 184, and 194) shown in FIG. 5 are embedded in the insulation material of the bobbin 20 so that the mounted portions 76, 86, and 96 (176, 186, and 196) are arranged between the joint wire portions 72, 82, 92*a*, and 92*b* (172, 182, 192*a*, 192*b*) in the Y-axis direction.

As shown in FIG. 3, the terminals 80, 90, and 70 are arranged in this order in the Y-axis direction in the terminal block 22, but on the other hand, the terminal 170, 190, and 180 are arranged in this order in the terminal block 23.

As shown in FIG. 2, the lower surfaces of the mounted portions 76, 86, and 96 (176, 186, and 196) protrude downward from the lower surface of the bobbin 20 by a predetermined height. Preferably, the predetermined height is larger than zero and is about 0.5-2 times as large as the thickness of the plate member of the mounted portions 76, 86, and 96 (176, 186, and 196).

In the present embodiment, as shown in FIG. 4A, 10 mounting-side convex portions 28 are formed in total below the bobbin 20, and the lower surfaces of the convex portions 28 are the lower surface of the bobbin 20. Five mounting-side convex portions 28 are formed away from each other at predetermined intervals in the Y-axis direction on the lower surface of the terminal block 22 (23). Lead connection grooves (conductive passages) 29 are formed between the mounting-side convex portions 28 next to each other in the Y-axis direction.

Preferably, the outer end surfaces of the mounting-side convex portions 28 in the X-axis direction are set back on the outer end surface of the bobbin 20 in the X-axis direction by a predetermined distance. In the present embodiment, as shown in FIG. 2, the mounted portions 76, 86, and 96 (176,

186, and 196) extend to protrude outward in the X-axis direction from the outer end surfaces of the mounting-side convex portions 28 more than the outer end surface of the bobbin 20. In this structure, the outer end surfaces of the mounting-side convex portions 28 reinforce the boundary portions between the mounted portions 76, 86, and 96 (176, 186, and 196) and the embedded portions 74, 84, and 94 (174, 184, and 194), and the mounted portions 76, 86, and 96 (176, 186, and 196) are easily installed on a mounting surface of an external circuit board (not shown) or so.

Preferably, the protrusion height of the mounting-side convex portions 28 is determined so as to sufficiently ensure the depth of the accommodation concave portion 24 (25) shown in FIG. 1 and further ensure the lead connection grooves 29 shown in FIG. 4A.

In the present embodiment, as shown in FIG. 2, the winding shaft portion 102 is formed by combining the bottom wall 32 located between the pair of connection side portions 26 shown in FIG. 5 and the bottom wall 42 of the core body 40. That is, the coil portion 60 is formed by winding the first wire 62, the second wires 63 and 64, and the third wire 65 around the winding shaft portion 102 including the bottom wall 42 of the core body 40 made of magnetic material. The coil portion 60 is partitioned by the partition walls 34 and 44 and is divided into the first section 60*a* and the second section 60*b*.

The four wires 62-65 are a conductive wire covered with an insulating film (insulation covered conductor). In the present embodiment, for example, the insulation film of the wires 62-65 can be polyurethane, ETFE, PFA, PET, polyamide, PPS, etc.

The coil portion 60 is formed by winding the wires 62-65 around the winding shaft portion 102 formed by combining the bottom wall 42, the bottom wall 32, and the connection side portions 26. The winding operation can be carried out automatically in the present embodiment, but may be carried out manually.

Figure 4B:
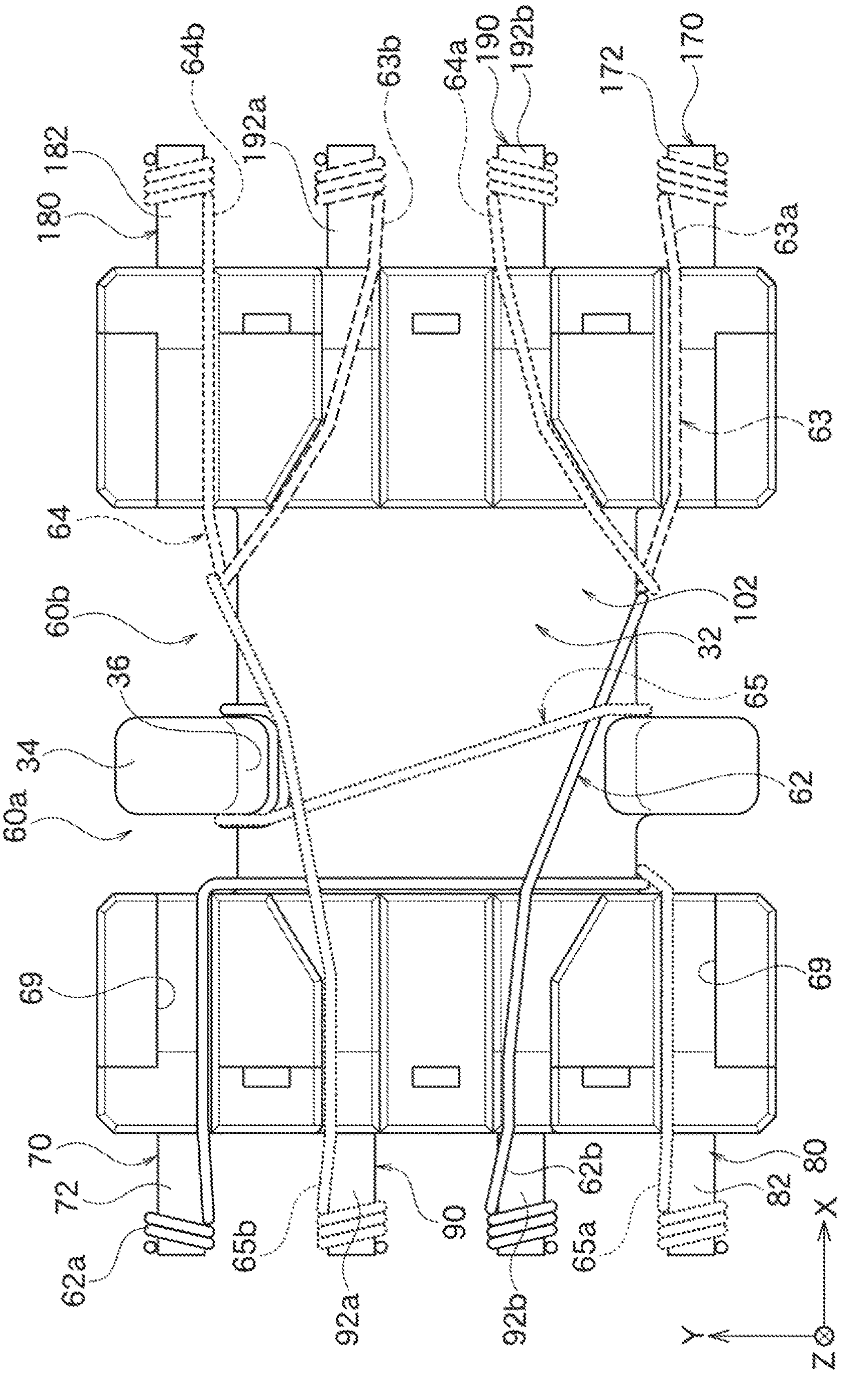
FIG. 4B is a bottom view illustrating a method of winding a wire constituting a coil element of the composite coil device shown in FIG. 4A.

Next, a winding procedure of the wires 62-65 is explained mainly based on FIG. 4B and FIG. 6.

Figure 6A:
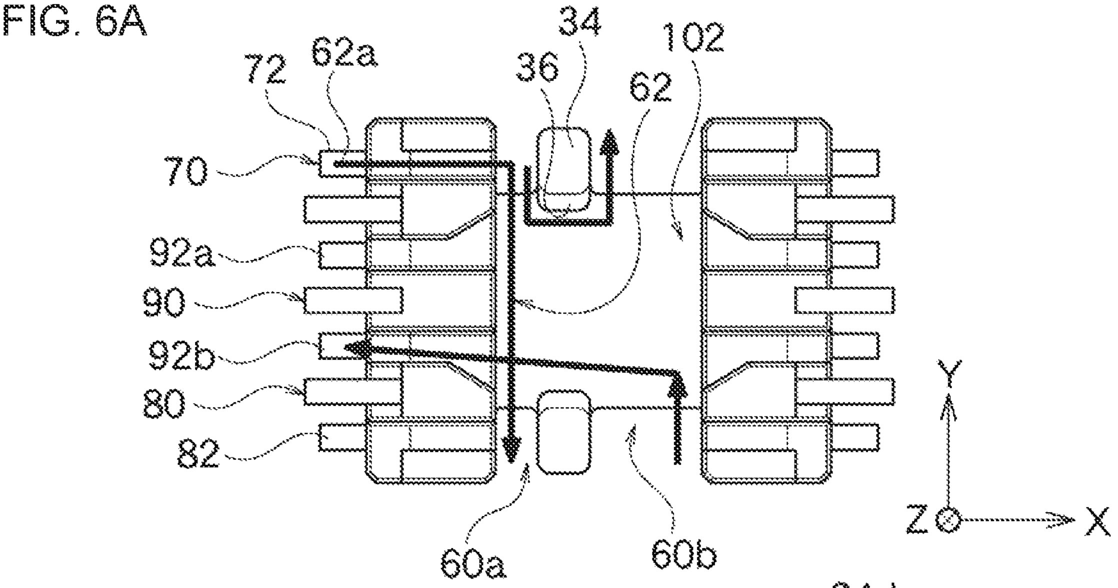
FIG. 6A to FIG. 6C are a bottom view of a bobbin illustrating the method of winding the wire shown in FIG. 4B in detail.

As shown in FIG. 4B and FIG. 6A, a lead portion 62*a*, which is one end of the first wire 62, is bound (or caulked, the same applies hereinafter) with the joint wire portion 72 of the terminal 70. Then, the first wire 62 passes through the connection groove 29 located near the terminal 70 and is wound around the winding shaft portion 102 in the first section 60*a* by plural turns. In FIG. 4B and FIG. 6, for easy illustration, the first wire 62 is illustrated by one turn or less than two turns, not plural turns. The same applies hereinafter.

After the first wire 62 is wound around the winding shaft portion 102 in the first section 60*a* by plural turns, the first wire 62 is moved to the second section 60*b* via the notch 36 of the partition wall 34 and is hooked with an edge of the notch 36 of the partition wall 34. After that, the first wire 62 is wound around the winding shaft portion 102 in the second section 60*b* by plural turns in the opposite direction to the winding direction in the first section 60*a*. After that, the first wire 62 is bound with the joint wire portion 92*b* of the terminal 90 located at the center in the Y-axis direction via the notch 36 of the partition wall 34.

Figure 7A:
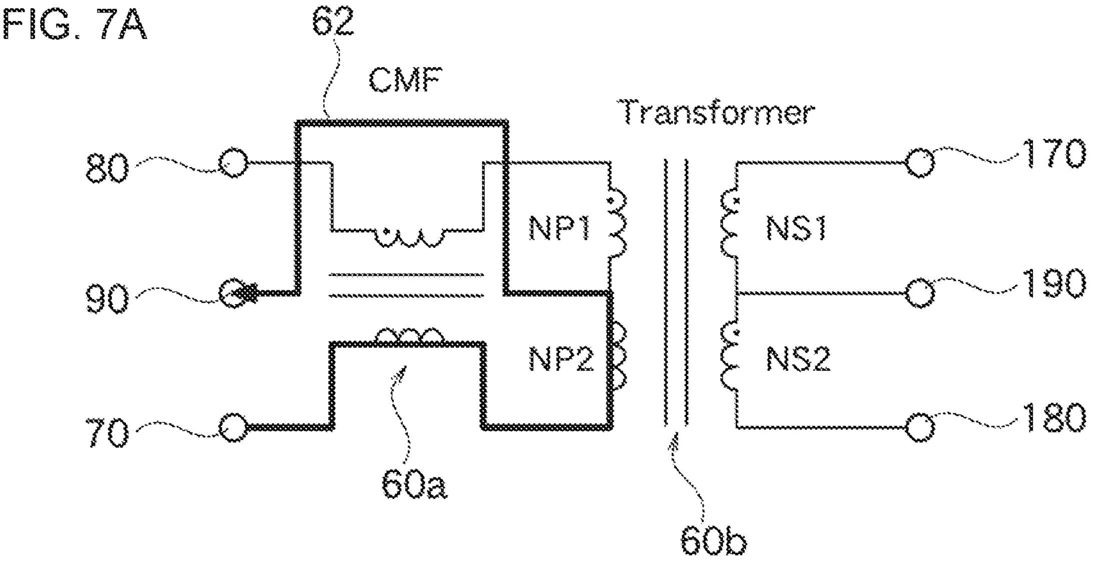
FIG. 7A to FIG. 7C are a circuit diagram of a portion corresponding to the method of winding the wire shown in FIG. 6A to FIG. 6C.

As a result, as shown in FIG. 7A, the first wire 62 constitutes a coil element of a common mode filter in the first section 60*a* and simultaneously constitutes a coil element NP2 of a transformer in the second section 60*b*.

Figure 6B:
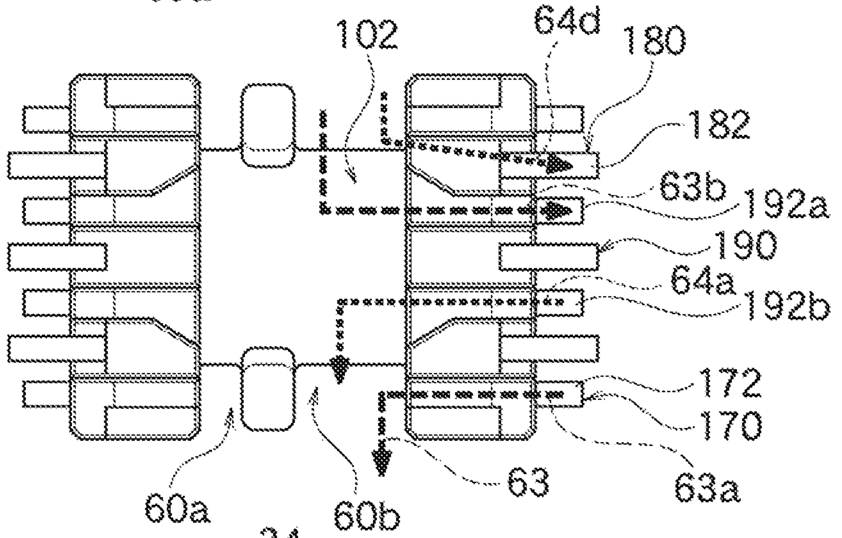

Next, as shown in FIG. 4B and FIG. 6B, a lead portion 63*a*, which is one end of the second wire 63, is bound with the joint wire portion 172 of the terminal 170, and a lead portion 64*a*, which is one end of the second wire 64, is bound with the joint wire portion 192*b* of the terminal 190. Then, the second wires 63 and 64 pass through the lead connection grooves 29 located near the joint wire portions 172 and 192*b* of the terminals 170 and 190 and are bifilar-wound around the winding shaft portion 102 by plural turns in the second section 60*b*. Incidentally, the winding directions of the second wires 63 and 64 are the same and are opposite to the winding direction of the first wire 62 in the second section 60*b*.

A lead portion 63*b*, which is the other end of the second wire 63, is bound with the joint wire portion 192*a* of the terminal 160. The other end 64*b* of the second wire 64 is bound with the joint wire portion 182 of the terminal 180. Since the joint wire portion 192*a* and the joint wire portion 192*b* are formed on the same terminal 190, the lead portion 63*b* and the lead portion 64*a* are electrically connected by the terminal 190.

Figure 7B:
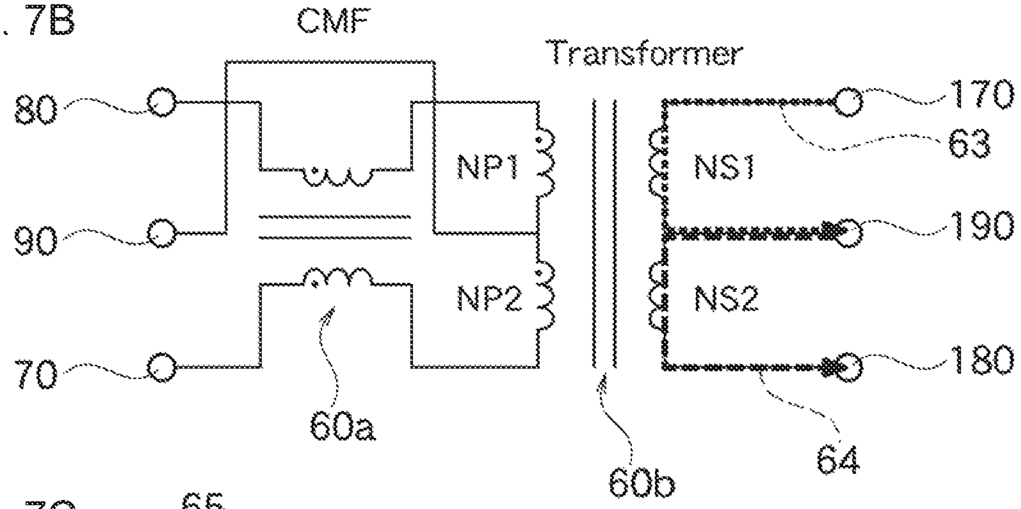

As a result, as shown in FIG. 7B, the second wires 63 and 64 constitute coil elements NS1 and NS2 of a transformer in the second section 60*b*, respectively. In the present embodiment, the two second wires 63 and 64 are bifilar-wound at the same time, but the wires 63 and 64 may be wound independently. For example, one second wire may be wound from the joint wire portion 172 of the terminal 170 around the winding shaft portion 102 in the second section 60*b* as with the second wire 63, bound with the joint wire portion 192*a*, returned to the second section 60*b*, and wound there similarly to the second wire 64. In that case, two coil elements NS1 and NS2 shown in FIG. 7B can be formed by one second wire.

Figure 6C:
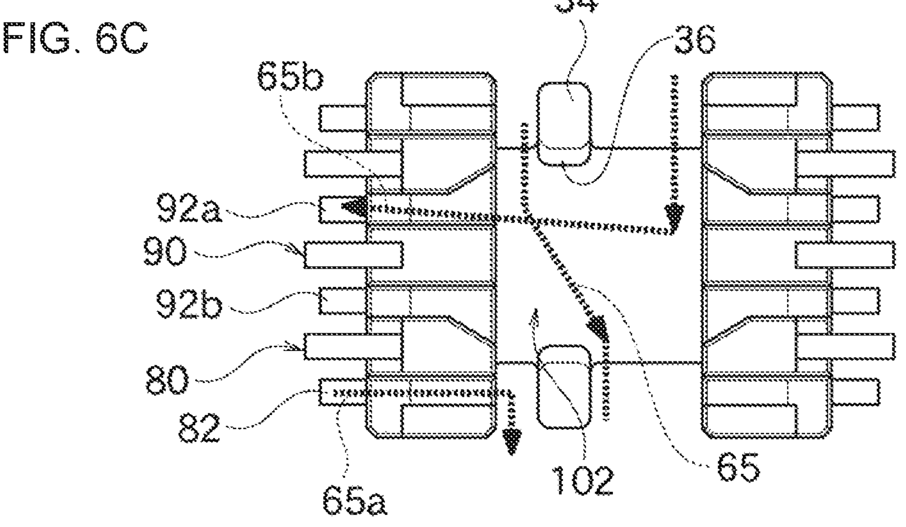

Next, as shown in FIG. 4B and FIG. 6C, a lead portion 65*a*, which is one end of the third wire 65, is bound with the joint wire portion 82 of the terminal 80. Then, the third wire 65 passes through the lead connection groove 29 located near the terminal 80 and is wound around the winding shaft portion 102 in the first section 60*a* by plural turns. Incidentally, the winding direction of the third wire 65 in the first section 60*a* is the same as that of the first wire 62 in the first section 60*a*.

After the third wire 65 is wound around the winding shaft portion 102 in the first section 60*a* by plural turns, the third wire 65 is moved to the second section 60*b* via the notch 36 of the partition wall 34 and is wound around the winding shaft portion 102 in the second section 60*b* by plural turns in the same direction as the winding direction in the first section 60*a*. After that, the third wire 65 is bound with the joint wire portion 92*a* of the terminal 90 located at the center in the Y-axis direction via the notch 36 of the partition wall 34.

Figure 7C:
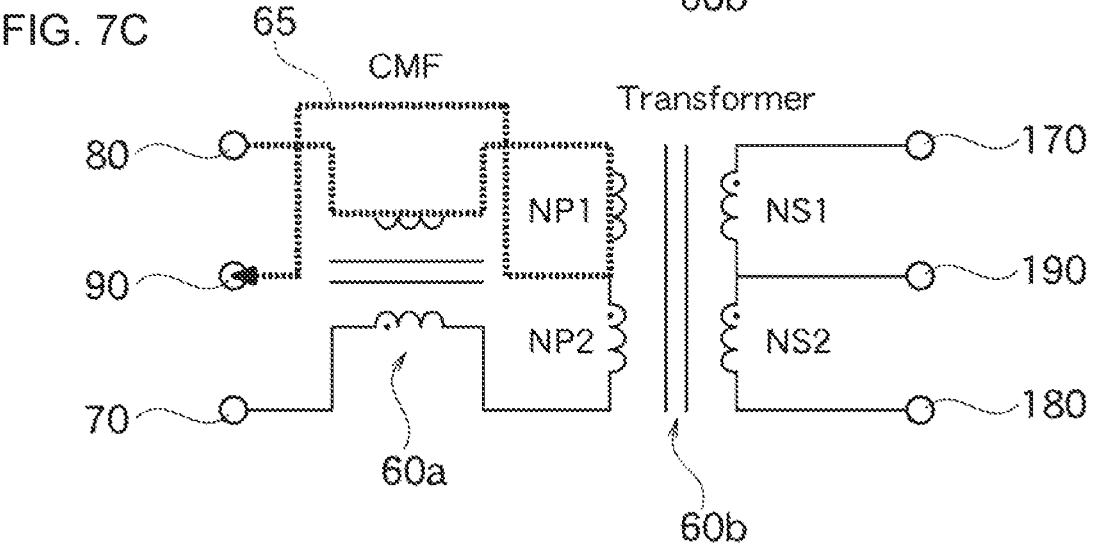

As a result, as shown in FIG. 7C, the third wire 65 constitutes another coil element of the common mode filter in the first section 60*a* and simultaneously constitutes a coil element NP1 of the transformer in the second section 60*b*.

Incidentally, the above-mentioned winding operation is an example of winding orders of the wires 62-65, and the winding order is not limited to the above-mentioned one. In the above-mentioned example, for example, the winding operation begins from the lead portions 62*a*-65*a* and ends at the lead portions 62*b*-65*b*, but the opposite can be accepted. A plurality of wires may be wound by various winding methods and winding orders depending on a circuit to be designed.

At the time of completion of a winding operation, if necessary, the tips of the joint wire portions 72, 82, 92*a*, 92*b*, 172, 182, 192*a*, and 192*b* may be, for example, irradiated with a laser to form connection portions 100 shown in FIG.

3, and the lead portions 62*a*, 62*b*, 63*a*, 63*b*, 64*a*, 64*b*, 65*a*, and 65*b* may be electrically connected and fixed to the joint wire portions. Incidentally, the connection portions 100 can be formed by a method other than laser irradiation, such as solder bonding, bonding with conductive adhesive, heat fusion, and resistance welding.

In the present embodiment, the flat plate portion 50 is preferably attached to the bobbin 20 after forming the connection portions 100 shown in FIG. 1, but may be attached to the notches 27 of the bobbin 20 before forming the connection portions 100 and after the winding operation of the wires 62-65 for forming the coil portion 60. After the flat plate portion 50 is attached, an adhesive agent may be applied to adhesion concave portions 30 formed on both sides of the flange accommodation concave portion 24 (25) in the Y-axis direction shown in FIG. 3. Due to this adhesive application, the flat plate portion 50, the core body 40, and the bobbin 20 can be bonded and fixed at the same time. The adhesive agent can be any adhesive agent, such as silicone resin, epoxy resin, UV resin, and anaerobic resin.

In the composite coil device 10 according to the present embodiment, the coil portion is not formed by directly winding a wire around a toroidal core, but the coil portion 60 is formed by winding the wires 62-65 around the winding shaft portion 102 structured by the connection side portions 26 and the bottom wall 32, which are a part of the bobbin 20, together with the bottom wall 42 of the core body 40 while the core body 40 is being attached to the bobbin 20. Thus, the winding shaft portion 102 is strengthened, the winding operation of the wires 62-65 is easy, the productivity is excellent, and the variation in characteristics is small.

In addition, since the flange portions 43 of the core body 42 are accommodated in the flange accommodation concave portions 24 and 25 of the terminal blocks 22 and 23, the withstand voltage is improved. In the present embodiment, as shown in FIG. 2, the shortest distance (insulation distance or creepage distance) between the core body 40 and the terminals 70, 80, 90, 170, 180, and 190 can be sufficiently large, and the insulation characteristics are thereby excellent.

In addition, the wires 62-65 are structured by a conductive wire covered with an insulation film. Since the wires 62-65 have a contact part with the surface of the core body 40, the formation of the insulation film can insulate the wires 62-65 and the core 40 and makes it possible to use a conductive core, such as a metal core, as the core body 40.

In addition, since the terminal blocks 22 and 23 are provided with the notches 27 for inserting the boundary portions between the bottom wall 42 and the flange portions 43, the core body 40 is easily attached and positioned to the bobbin 20, and the workability is improved. In addition, since both ends of the flat plate portion 50 different from the core body 40 is inserted into the upper parts of the notches 27, the flat plate portion 50, the core body 40, and the bobbin 20 are easily positioned and attached. Incidentally, the flat plate portion 50 may not necessarily be made of magnetic body. In that case, for example, the flat plate portion 50 can function as a suction part of a suction nozzle for moving a transformer at the time of mounting it.

In particular, in the composite coil device 10 according to the present embodiment, the first wire 62 can be continuous between the first section 60*a* and the second section 60*b* as shown in FIG. 4B and form another coil element in each of the sections 60*a* and 60*b* as shown in FIG. 7A. In addition, a transformer or so can be constituted between the coil element NS2 by the second wire 64 wound in the second section 60*b* shown in FIG. 7B and the coil element NP2 by the first wire 62. In the first section 60*a*, it is possible to constitute a coil element, such as a common mode filter circuit having a different function from a transformer formed in the second section 60*b*.

In the composite coil device 10 according to the present embodiment, coil elements having different functions can be formed in the first section 60*a* and the second section 60*b* without disposing an intermediate connection. In the composite coil device 10 according to the present embodiment, since no intermediate connection needs to be disposed, it is easy to automate the winding operation with an automatic winding machine, the cost can be reduced, and the stability of quality can easily be ensured. Compared to conventional composite coil devices in which a plurality of coil devices having different functions is connected by wiring, the composite coil device 10 according to the present embodiment can be miniaturized significantly.

The composite coil device 10 according to the present embodiment further includes the third wire 65 wound continuously in the first section 60*a* and the second section 60*b*, in addition to the first wire 62. The first wire 62, the second wires 63 and 64, and the third wire 65 are wound around the winding shaft portion 102 in the same axis.

In this structure, a circuit having a function of common mode filter or so can be formed by the first wire 62 and the third wire 65 in the first section 60*a*, and an additional transformer can be formed between the third wire 65 and the second wire 63 and between the first wire 62 and the second wire 64 in the second section 60*b*. Moreover, this structure makes it possible to significantly downsize the composite coil device 10 compared to conventional composite coil devices in which a common mode filter and a transformer are manufactured by separate coil devices and connected.

In the present embodiment, as shown in FIG. 4B, the winding shaft portion 102 includes a direction-changing portion formed by an edge of the notch 36 (36) of the partition wall 34 (34), and for example, the first wire 62 can be wound around the winding shaft portion 102 in opposite directions between the first section 60*a* and the second section 60*b*. Since the winding shaft portion 102 includes the direction-changing portion formed by the notch 36 (36) of the partition wall 34 (34), the first wire 62 can also be wound around the winding shaft portion 102 in opposite directions between the first section 60*a* and the second section 60*b*.

Likewise, the third wire 65 can be wound around the winding shaft portion 102 in opposite directions between the first section 60*a* and the second section 60*b*. In the present embodiment, however, the third wire 65 is not folded at the direction-changing portion, but is wound around the winding shaft portion 102 in the same direction between the first section 60*a* and the second section 60*b*. As a result, the circuit shown in FIG. 7C can be formed.

In the present embodiment, as shown in FIG. 2, the first wire 62 and the third wire 65 are wound in mutually different layers in the first section 60*a*, and the first wire 62, the second wires 63 and 64, and the third wire 65 are wound in mutually different layers in the second section 60*b*. In this structure, it is possible to effectively prevent the winding turbulence of the wires 62-65 for the winding shaft portion 102 and is easy to control the number of windings. This contributes to the stabilization of quality.

In addition, the winding shaft portion 102 includes the partition wall 34 (44) for partitioning the first section 60*a* and the second section 60*b*. Since the partition wall 34 (44) is formed, different coil elements are easily formed between the first section 60*a* and the second section 60*b*, and the coil elements are easily prevented from interfering with each other in the first section 60*a* and the second section 60*b*. Moreover, the partition wall 44 is also formed in the core body made of magnetic material. This structure makes it easy to prevent the coil elements from interfering with each other in the first section 60*a* and the second section 60*b*.

In the present embodiment, as shown in FIG. 4B, the partition wall 34 (34) on the bobbin 20 side includes the notch 36 (36) connecting the first section 60*a* and the second section 60*b*. The first wire 62 or the third wire 65 can be wound around the winding shaft portion 102 in the same axis while being continuous between the first section 60*a* and the second section 60*b* via the notch 36 (36). Incidentally, the second wires 63 and 64 are preferably wound around the winding shaft only in the second section 60*b*, but the second wire 63 or 64 may be wound around the winding shaft portion 102 in the first section 60*a* and the second section 60*b* via the notch 36 (36) depending on the application.

In the present embodiment, the notch 36 (36) is formed on the mounting surface side. In addition, the winding shaft portion 102 includes a part of the bobbin 20 (insulation member), the bobbin 20 (insulation member) includes the partition walls 34, the lower surface of the bottom wall 32 of the bobbin 20 is located on the mounting surface side, and the partition wall 34 (34) of the bottom wall 32 includes with the notch 36 (36).

In this structure, the first wire 62 or the third wire 65 can pass between the first section 60*a* and the second section 60*b* along the lower surface of the bottom wall 32 via the notch 36 (36) formed on the partition wall 34 (34). In addition, the lower surface of the partition wall 34 (34) sufficiently protrudes downward in the Z-axis from the lower surface of the bottom wall 32. Thus, a coil element continuing between the first section 60*a* and the second section 60*b* is easily formed while maintaining the insulation with, for example, an external circuit board not shown. In addition, the structure contributes to downsizing of the device.

As shown in FIG. 2, the winding shaft portion 102 is structured by attaching at least a part of the core body 40 made of magnetic body to a concave portion of the bobbin 20 having an opening on its upper side. In this structure, it is possible to more easily form coil elements having different functions in the first section 60*a* and the second section 60*b* without disposing an intermediate connection.

Since the bottom wall 32 of the bobbin 20 is disposed on the mounting surface side as shown in FIG. 2, a coil element continuing between the first section 60*a* and the second section 60*b* is easily formed while maintaining the insulation with, for example, an external circuit board not shown. In addition, the structure contributes to downsizing of the device.

Since the core body 40 is a core having an E-shaped cross section, the first section 48 and the second section 49 can easily be formed in the magnetic body, and the partition wall 44 can also easily be formed between the first section 48 and the second section 49.

Figure 8:
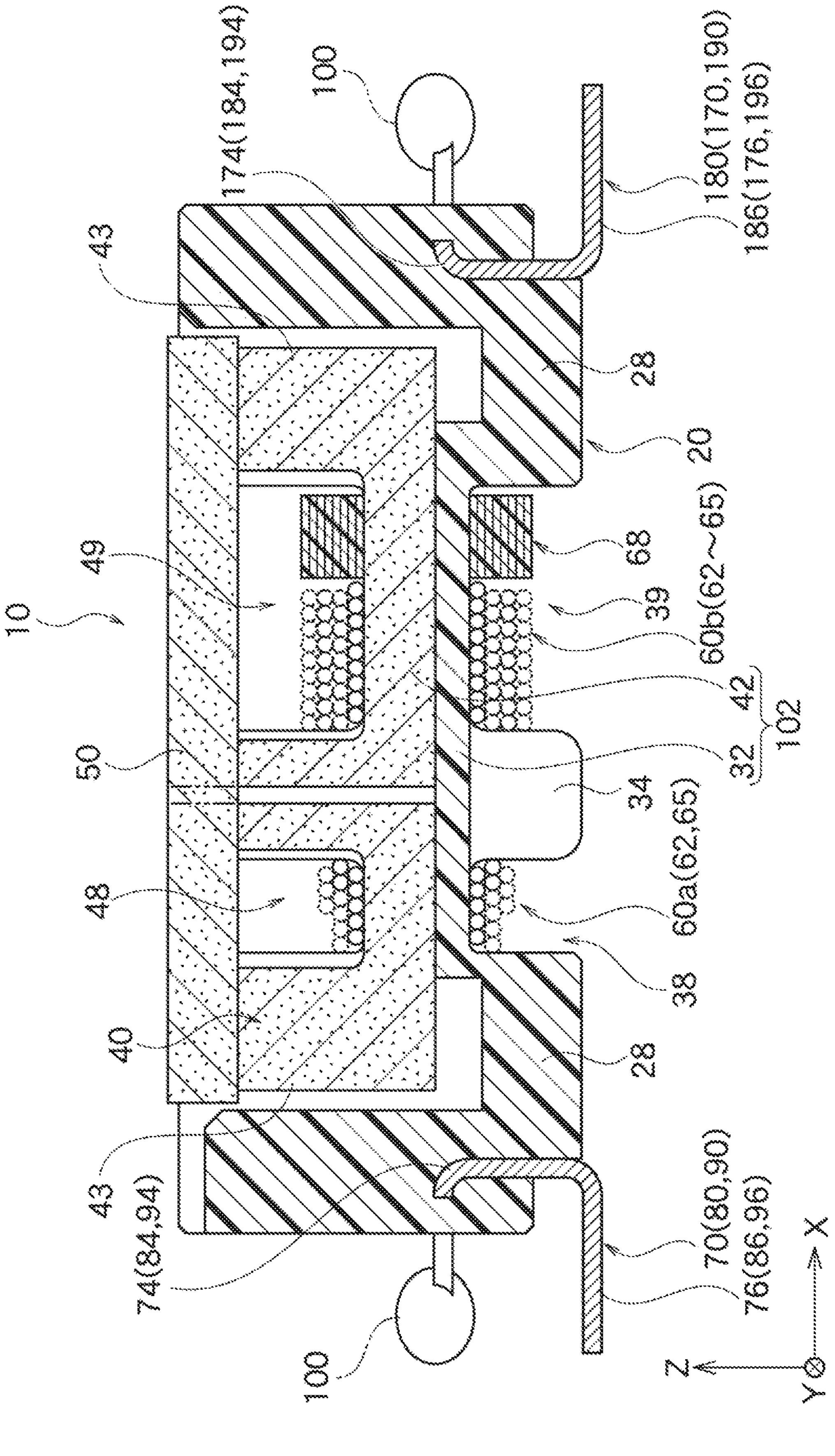
FIG. 8 corresponds to FIG. 2 and is a cross-sectional view of a composite coil device according to another embodiment of the present invention.

In addition, as shown in FIG. 8, the core body 40 having an E-shaped cross section may be separated in the X-axis direction of the winding shaft portion 102. For example, when the core body 40 having an E-shaped cross section is axially separated into a core constituting the first section 48 and a core constituting the second section 49, the coil elements formed in the sections 48 and 49 can further be prevented from interfering with each other. Moreover, for example, the coupling coefficient between the coil elements can be reduced. The flat plate portion 50 made of a flat-plate-shaped magnetic core may also be separated in the X-axis direction of the winding shaft portion. This structure can further reduce the coupling between the coil elements formed in the first section 60*a* and the second section 60*b*.

In the present embodiment, as shown in FIG. 2, the core body 40 and the flat plate portion 50 made of magnetic material have a shape for forming a closed magnetic path in the first section 48 and the second section 49. This structure can reduce the coupling between the coil elements formed in the first section 60*a* and the second section 60*b*.

Since the flat plate portion 50 made of magnetic body exists in the first section 60*a* and the second section 60*b*, a closed magnetic path is easily formed in the first section 48 and the second section 49.

Moreover, since the second wire is structured by a least two conductor wires 63 and 64 bifilar-wound around the winding shaft portion 102, two pairs of transformers are easily formed in the second section 60*b*.

Moreover, as shown in FIG. 2, a spacer 68 for preventing a winding disturbance of the first wire 62, the second wires 63 and 64, or the third wire 65 is disposed on the winding shaft portion 102 located in the first sections 38 and 48 or the second section 39 and 49. When the spacer 68 is disposed as necessary, the winding disturbance can effectively be prevented. Incidentally, the spacer 68 can also be formed by winding an insulation tape around the winding shaft portion 102.

Incidentally, the present invention is not limited to the above-mentioned embodiment and can variously be modified within the scope of the present invention.

For example, the core body 40 may have any shape as long as it is at least a part of the winding shaft portion 102, such as so-called U type core and drum type core. In addition, there is no limit to the number of wires 62-65 or the number of terminals. Moreover, as shown in FIG. 4B, the bottom of the notch 36 (36) is flush with the lower surface of the bottom wall 32 of the winding shaft portion 102, but there may be a slight step between the bottom of the notch 36 (36) and the lower surface of the bottom wall 32 of the winding shaft portion 102.

The winding shaft portion 102 may be structured by only the core body 40 and the connection side portions 26. That is, the bottom plate 32 of the bobbin 20 may not exist. Instead, the winding shaft portion 102 may be structured by only the core body 40.

DESCRIPTION OF THE REFERENCE NUMERICAL

10 . . . composite coil device
20 . . . bobbin
22, 23 . . . terminal block
24, 25 . . . flange accommodation concave portion
26 . . . connection side portion
27 . . . notch
28 . . . mounting-side convex portion
29 . . . lead connection groove
30 . . . adhesion concave portion
32 . . . bottom wall
34 . . . partition wall
36 . . . notch
38 . . . first section
39 . . . second section
40 . . . core body
42 . . . bottom wall
43 . . . flange portion
44 . . . partition wall
45 . . . flange central portion
46 . . . flange side convex portion

48 . . . first section
49 . . . second section
50 . . . flat plate portion
60 . . . coil portion
60*a* . . . first section
60*b* . . . second section
62 . . . first wire (first conductor)
63, 64 . . . second wire (second conductor)
65 . . . third wire (third conductor)
62*a*, 62*b*, 63*a*, 63*b*, 64*a*, 64*b*, 65*a*, 65*b* . . . lead portion
68 . . . spacer
70, 80, 90 . . . terminal
72, 82, 92*a*, 92*b* . . . joint wire portion
74, 84, 94 . . . embedded portion
76, 86, 96 . . . mounted portion
100 . . . connection portion
102 . . . winding shaft portion
170, 180, 190 . . . terminal
172, 182, 192*a*, 192*b* . . . joint wire portion
174, 184, 194 . . . embedded portion
176, 186, 196 . . . mounted portion

What is claimed is:

1. A composite coil device comprising:
a winding shaft portion at least partly including a magnetic body and axially including a first section and a second section;
a first conductor portion and a third conductor portion wound continuously in the first section and the second section; and
a second conductor portion wound in the second section, wherein
at least a part of a core of the magnetic body is attached to a concave portion of a bobbin having an opening, and
the first conductor portion and the second conductor portion are wound around and contact both the core and the bobbin.

2. The composite coil device according to claim 1, wherein the first conductor portion and the second conductor portion are wound in mutually different layers at least in the second section.

3. The composite coil device according to claim 1, wherein the winding shaft portion includes a partition wall for partitioning the first section and the second section.

4. The composite coil device according to claim 3, wherein the winding shaft portion includes a notch connecting the first section and the second section.

5. The composite coil device according to claim 4, wherein the notch is formed on a mounting surface side of the composite coil device.

6. The composite coil device according to claim 1, wherein the bobbin is disposed on a mounting surface side of the composite coil device.

7. The composite coil device according to claim 6, wherein the core comprises separatable members combined with each other.

8. The composite coil device according to claim 1, wherein the core comprises separatable members combined with each other.

9. The composite coil device according to claim 1, wherein the magnetic body has a shape for forming a closed magnetic path in the first section and/or the second section.

10. The composite coil device according to claim 1, wherein the magnetic body has a plate member in the first section and/or the second section.

11. The composite coil device according to claim 1, wherein the second conductor portion comprises at least two conductor wires bifilar-wound around the winding shaft portion.

12. The composite coil device according to claim 1, wherein a spacer for preventing a winding disturbance of the first conductor portion or the second conductor portion is disposed on the winding shaft portion located in the first section or the second section.

13. A composite coil device comprising:
a winding shaft portion at least partly including a magnetic body and axially including a first section and a second section;
a first conductor portion wound continuously in the first section and the second section; and
a second conductor portion wound in the second section, wherein
at least a part of a core of the magnetic body is attached to a concave portion of a bobbin having an opening,
the first conductor portion and the second conductor portion are wound around and contact both the core and the bobbin,
the winding shaft portion includes a direction-changing portion, and
the first conductor portion is wound around the direction-changing portion in opposite directions between the first section and the second section.

* * * * *